United States Patent
Sasaki

(10) Patent No.: US 10,133,687 B2
(45) Date of Patent: Nov. 20, 2018

(54) COMMUNICATION APPARATUS AND DATA PROCESSING METHOD

(71) Applicant: CANON KABUSHIKI KAISHA, Tokyo (JP)

(72) Inventor: Akitomo Sasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 14/334,977

(22) Filed: Jul. 18, 2014

(65) Prior Publication Data
US 2015/0039821 A1 Feb. 5, 2015

(30) Foreign Application Priority Data

Aug. 1, 2013 (JP) .................................. 2013-160793
May 12, 2014 (JP) .................................. 2014-098893

(51) Int. Cl.
*G06F 13/16* (2006.01)

(52) U.S. Cl.
CPC ...... *G06F 13/1663* (2013.01); *G06F 13/1673* (2013.01)

(58) Field of Classification Search
CPC ......... H04L 69/16; H04L 49/90; H04L 29/06; H04L 29/06027; H04L 69/164; H04L 69/165; G06F 13/1663; G06F 12/0802; G06F 13/1673; G06F 5/10
See application file for complete search history.

(56) References Cited

U.S. PATENT DOCUMENTS

| | | | | |
|---|---|---|---|---|
| 5,555,322 A | * | 9/1996 | Terai | G06T 9/005 358/1.9 |
| 5,761,438 A | | 6/1998 | Sasaki | 395/200.77 |
| 6,003,120 A | * | 12/1999 | Hardin | G06F 13/4243 711/104 |
| 7,720,979 B2 | * | 5/2010 | Minami | H04L 69/16 709/227 |
| 8,867,275 B2 | * | 10/2014 | Shin | G11C 16/10 365/185.03 |
| 2005/0083917 A1 | * | 4/2005 | Okamoto | H04L 29/06 370/352 |
| 2005/0122986 A1 | * | 6/2005 | Starr | H04L 69/16 370/412 |
| 2006/0092934 A1 | * | 5/2006 | Chung | H04L 47/2441 370/389 |
| 2010/0306511 A1 | * | 12/2010 | Mochizuki | H04L 12/413 712/225 |
| 2011/0055457 A1 | * | 3/2011 | Yeh | G06F 3/0611 711/103 |

FOREIGN PATENT DOCUMENTS

| | | |
|---|---|---|
| JP | 09205439 A | 8/1997 |
| JP | 2009-020684 A | 1/2009 |

OTHER PUBLICATIONS

Japanese Office Action issued in corresponding Japanese Application No. 2014098893 dated Feb. 2, 2018.

* cited by examiner

*Primary Examiner* — Zhuo H Li
(74) *Attorney, Agent, or Firm* — Fitzpatrick, Cella, Harper & Scinto

(57) ABSTRACT

A communication apparatus comprises a general-purpose memory, and a high-speed memory that allows higher-speed access than the general-purpose memory. Protocol processing is executed to packetize transmission data using a general-purpose buffer allocated to the general-purpose memory and/or a high-speed buffer allocated to the high-speed memory as network buffers.

6 Claims, 16 Drawing Sheets

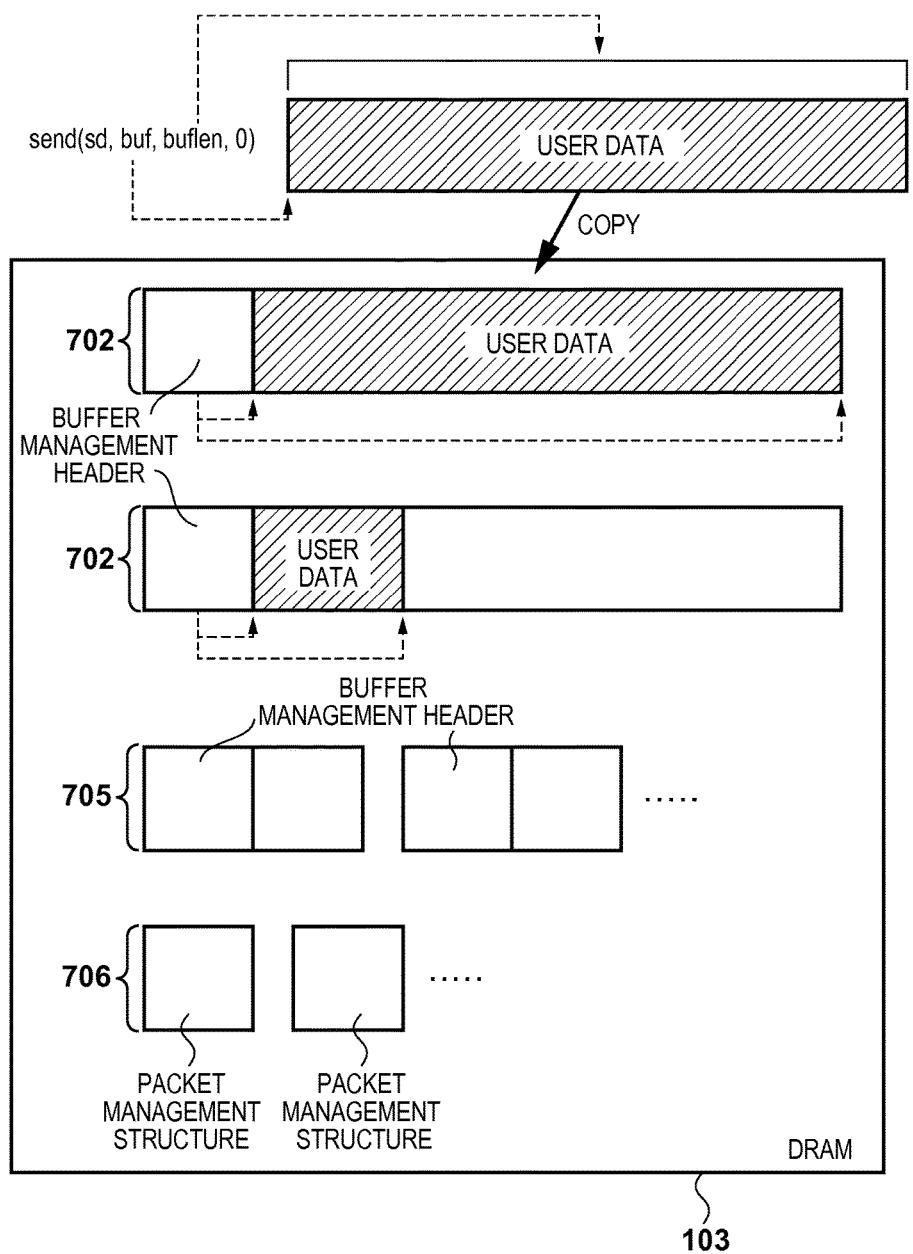

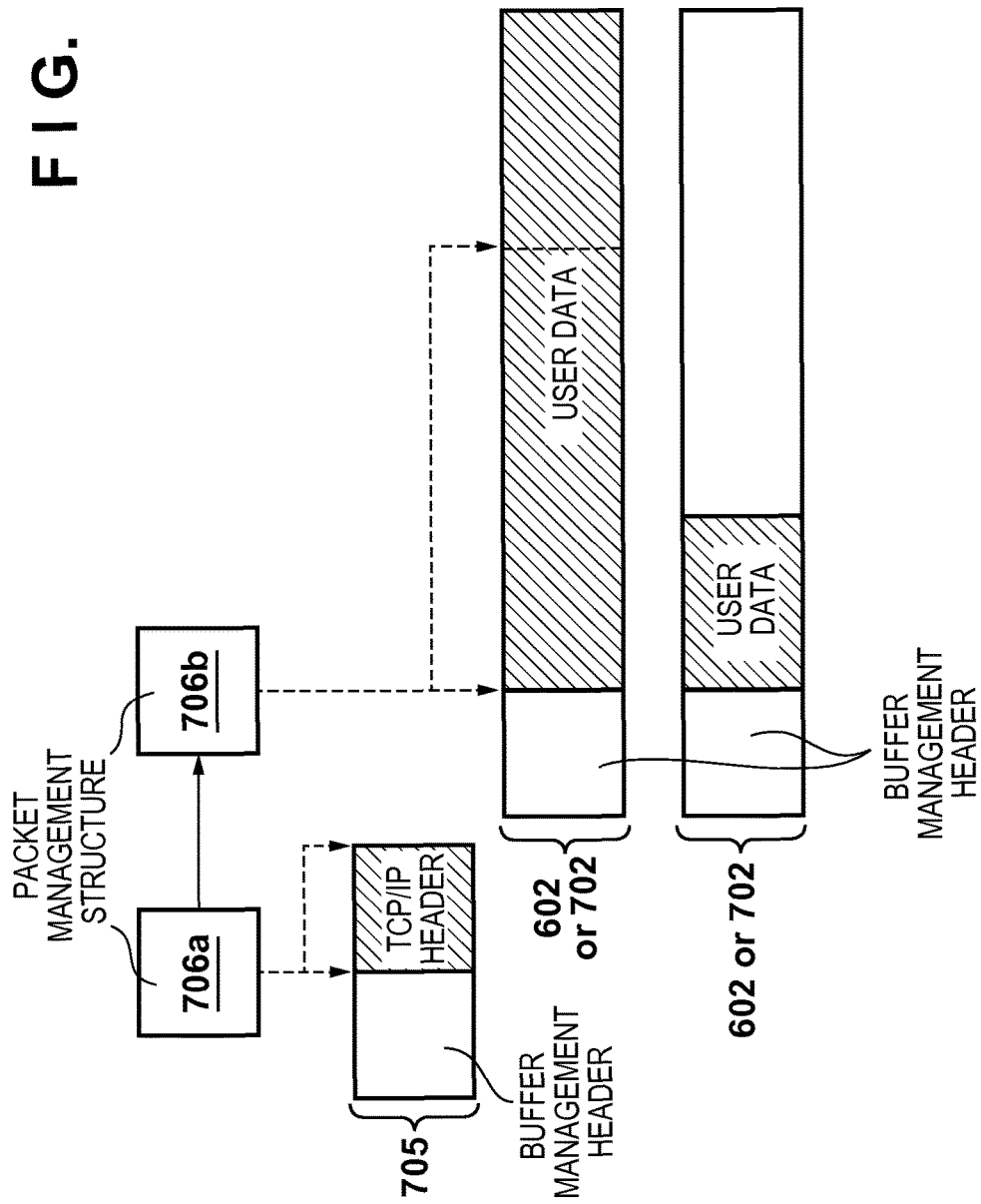

F I G. 16
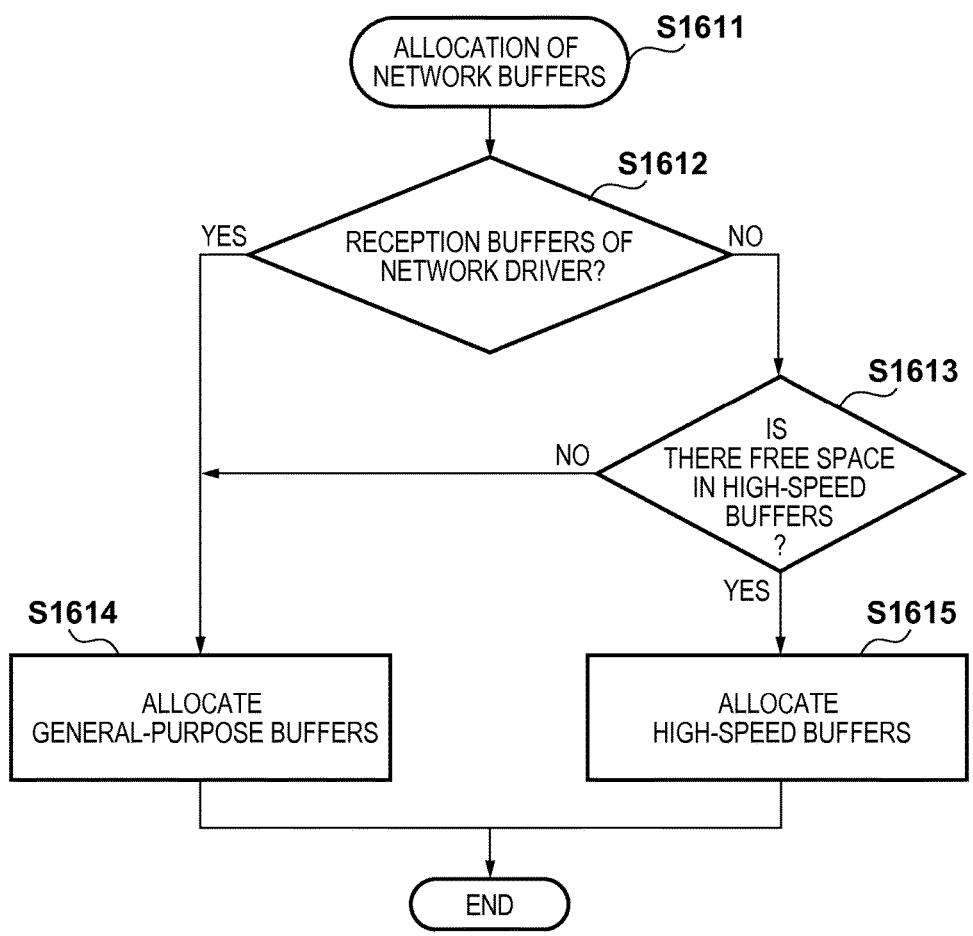

COMMUNICATION APPARATUS AND DATA PROCESSING METHOD

BACKGROUND OF THE INVENTION

Field of the Invention

The present invention relates to protocol processing for performing data communication.

Description of the Related Art

There is provided TCP/IP (Transmission Control Protocol/Internet Protocol) as a major protocol used for Internet communication. A socket API (Application Programming Interface) is defined to generate a program using TCP/IP. Furthermore, a network buffer is prepared for packetization and retransmission processing of communication data in TCP/IP protocol processing.

To transmit a TCP/IP packet, user data designated by a socket API send( ) is copied to the network buffer. The data copied to the network buffer is divided into MTUs (Maximum Transmission Units), thereby obtaining a plurality of segments. The checksum of a pseudo header for a checksum and each segment is calculated, and a TCP/IP packet added with a TCP header and IP header is generated. If a transmission path is Ethernet®, an Ethernet® frame is generated by adding an Ethernet® header to the TCP/IP packet, and then the Ethernet® frame is transmitted.

Since a wide area of a memory is accessed to copy data from a user buffer to a network buffer, and calculate a checksum, if the memory access speed is low, it is impossible to generate a TCP/IP packet at high speed. To generate a TCP/IP packet at high speed, an SRAM (Static Random-Access Memory) that allows higher-speed access may be used as a network buffer, instead of a DRAM (Dynamic Random-Access Memory).

Because of limitations on the cost and chip area, however, it is impossible to sufficiently increase the memory size of the SRAM, and to allocate a sufficient network buffer to the SRAM.

SUMMARY OF THE INVENTION

In one aspect, a communication apparatus comprising: a first memory; a second memory that allows higher-speed access than the first memory; and a protocol processing unit configured to packetize transmission data using a general-purpose buffer allocated to the first memory and/or a high-speed buffer allocated to the second memory as network buffers.

According to the aspect, a connection requiring high-speed communication can preferentially use a network buffer allocated to a high-speed memory.

Further features of the present invention will become apparent from the following description of exemplary embodiments with reference to the attached drawings.

BRIEF DESCRIPTION OF THE DRAWINGS

FIG. 6 is a view for explaining processing of copying user data to general-purpose buffers.

FIGS. 7A and 7B are views for explaining TCP/IP packetization.

FIG. 16 is a flowchart for explaining details of network buffer allocation processing.

DESCRIPTION OF THE EMBODIMENTS

Communication processing according to an embodiment of the present invention will be described in detail below with reference to the accompanying drawings.

[Overview]

One of factors that disable allocation of all network buffers to a memory (to be referred to as a "high-speed memory" hereinafter) such as an SRAM which allows high-speed access is that one or a plurality of applications simultaneously perform the communication operations of a plurality of connections. To solve this problem, a connection requiring high-speed communication is allowed to preferentially use network buffers (to be referred to as "high-speed buffers" hereinafter) allocated to the high-speed memory by making a connection that does not require high-speed communication use network buffers (to be referred to as "general-purpose buffers" hereinafter) allocated to a memory (to be referred to as a "general-purpose memory" hereinafter) such as a DRAM.

In the embodiment, whether to use the high-speed buffers or general-purpose buffers can be designated for each connection. Among connections, only specific connections use the high-speed buffers.

Furthermore, in the embodiment, by designating, for example, the attributes of a packet instead of designating connections, only packets whose attributes match the designated attributes use the high-speed buffers.

In the embodiment, an acknowledgement (ACK) of a TCP connection that uses the high-speed buffers is monitored. The use of the high-speed buffers by a connection whose ACK reception interval is long (whose communication speed is low) is inhibited. Alternatively, if no ACK has been received for a predetermined time, data in the high-speed buffers used by a corresponding connection is copied to the general-purpose buffers, thereby freeing the high-speed buffers.

First Embodiment

[Arrangement of Apparatus]

Figure 1:
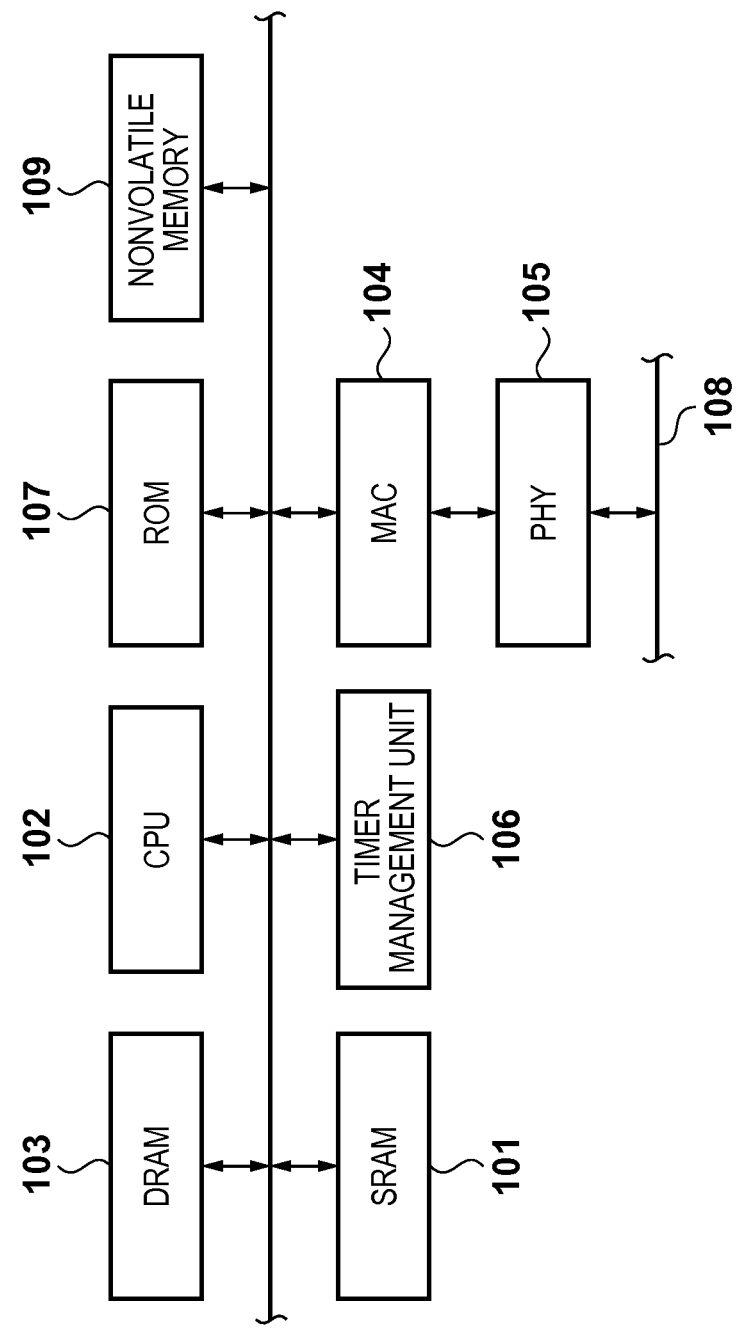
FIG. 1 is a block diagram showing the arrangement of a communication apparatus according to an embodiment.

FIG. 1 is a block diagram showing the arrangement of a communication apparatus according to the embodiment. A microprocessor (CPU) 102 uses, as a work memory, a DRAM 103 serving as a main memory to execute various programs stored in a read only memory (ROM) 107 and a nonvolatile memory 109 such as a hard disk drive (HDD) or solid-state drive (SSD). The programs executed by the CPU 102 include a network driver. The functions of protocol processing including data processing of packetizing transmission data (to be described later) and ACK reception processing are implemented by executing the network driver.

A media access control module (MAC) 104 and a physical layer module (PHY) 105 serve as a communication unit for performing communication through a network 108 such as Ethernet®. The CPU 102 executes the network driver, and controls the MAC 104, thereby transmitting/receiving data.

The aforementioned arrangement is the same as that of a typical communication apparatus. However, the communication apparatus of the embodiment also includes a timer management unit 106 (to be described later), and an SRAM 101 as a high-speed memory in addition to the DRAM 103 as a general-purpose memory.

[Connection Management Structure]

Figure 2:
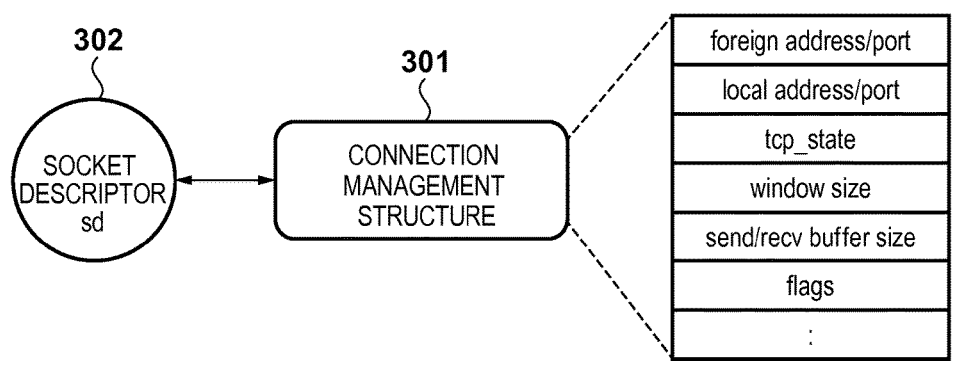
FIG. 2 is a view for explaining a connection management structure.

A connection management structure will be described with reference to FIG. 2. A connection management structure 301 allocated to the DRAM 103 is a structure (management information) for storing various kinds of information, and managing a connection such as a TCP connection. The stored information includes the following information, that is, the IP address (foreign IP address) and port number (foreign port number) of a destination, the IP address (local IP address) and port number (local port number) of the self apparatus, a TCP state, the window size of a partner apparatus, a transmission/reception buffer size, a flag for adding additional information, and the like.

A socket descriptor (sd) 302 is information obtained as the return value of a socket API socket( ). That is, upon calling the socket API socket( ), the connection management structure 301 is acquired, and associated with the socket descriptor (sd) 302.

Figure 3:
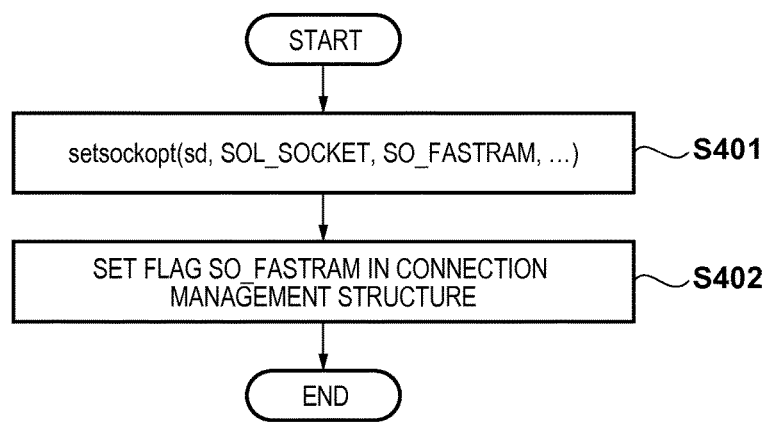
FIG. 3 is a flowchart illustrating an instruction method when high-speed buffers are used.

An instruction method when high-speed buffers are used will be described with reference to a flowchart shown in FIG. 3. When using the high-speed buffers, an application executed by the CPU 102 calls a socket API setsockopt( ) in which the socket descriptor sd and a flag SO_FASTRAM are designated (S401). Upon calling setsockopt( ), the network driver sets the use flag SO_FASTRAM indicating the use of the high-speed buffers in the connection management structure corresponding to the socket descriptor sd (S402).

[Data Transmission]

Figure 4:
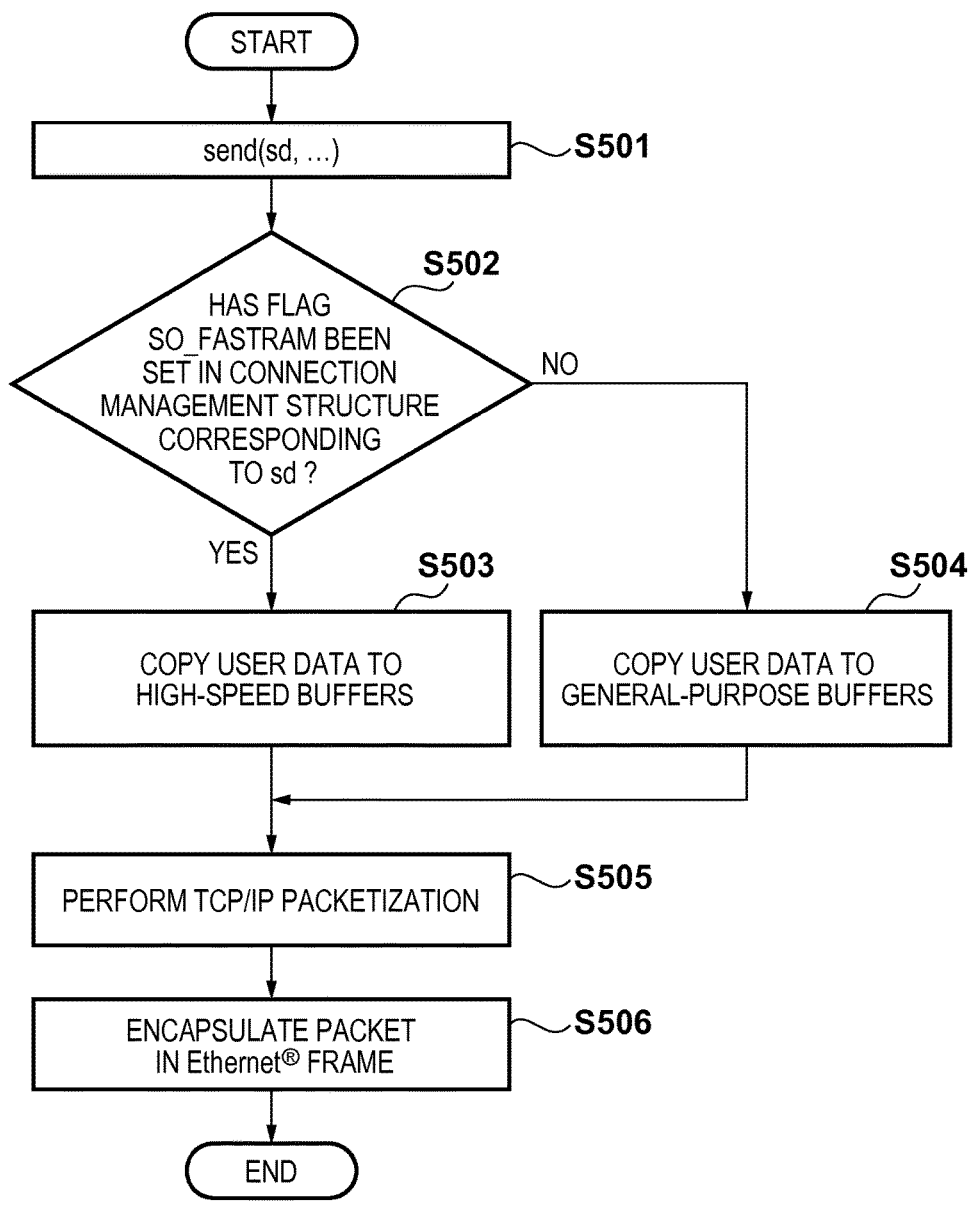
FIG. 4 is a flowchart for explaining data transmission by the socket API send( ) according to the first embodiment.

Data transmission by the socket API send( ) according to the first embodiment will be described with reference to a flowchart shown in FIG. 4. An application executed by the CPU 102 calls send( ) in which the socket descriptor sd is designated (S501). Upon calling send( ), the network driver determines whether the flag SO_FASTRAM has been set in the connection management structure corresponding to the socket descriptor sd (S502).

If the flag has been set in the connection management structure corresponding to the socket descriptor sd, the network driver copies user data to high-speed buffers allocated to the SRAM 101 (S503). Alternatively, if the flag has not been set, the network driver copies the user data to general-purpose buffers allocated to the DRAM 103 (S504).

After that, the network driver calculates a checksum for generating a TCP header, generates a TCP/IP header, and performs the TCP/IP packetization of the user data (S505). Furthermore, the network driver generates an Ethernet® header, encapsulates the TCP/IP packet in an Ethernet® frame, and transmits the Ethernet® frame to the MAC 104 (S506).

Figure 5:
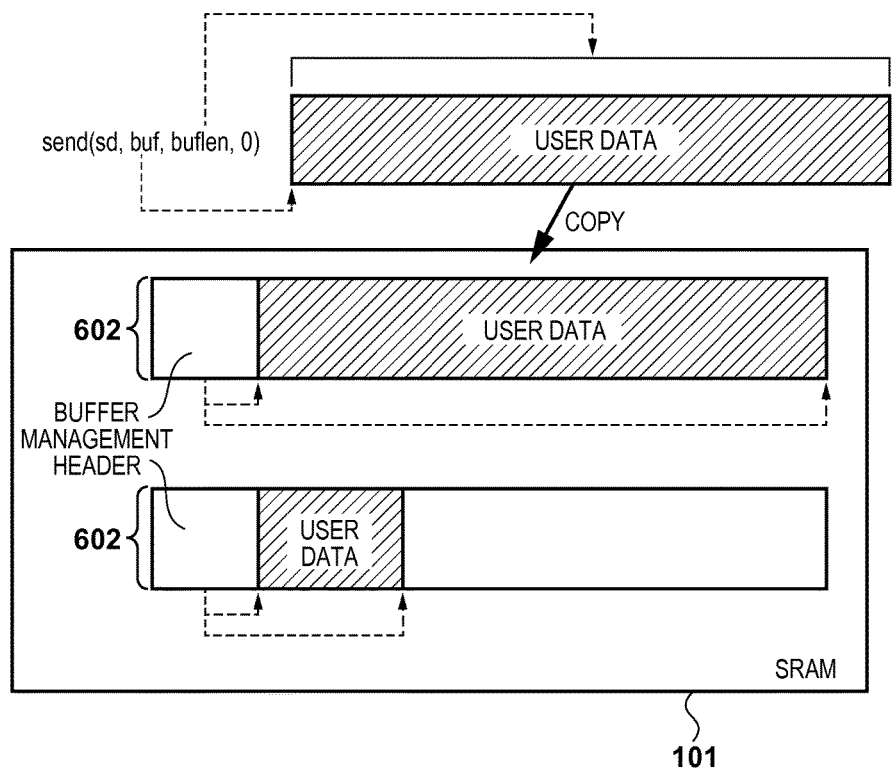
FIG. 5 is a view for explaining processing of copying user data to the high-speed buffers.

The processing (S503) of copying the user data to the high-speed buffers will be described with reference to FIG. 5. In this example, the size of each network buffer 602 allocated to the SRAM 101 is fixed. It is possible to process user data having a large data size by using a plurality of network buffers 602.

The socket API send( ) is called in the following format.
send(int sd, const void *buf, size_t buflen, int flags);
where sd represents the socket descriptor,
buf represents the first pointer of transmission data, and
buflen represents a transmission data size.

Upon calling the socket API send( ), user data having the data size buflen and starting from an address designated by the pointer buf is copied to the network buffers 602. If one network buffer 602 is not enough to store the user data, another network buffer 602 is used. In the example of FIG. 5, the two network buffers 602 are used. A buffer management header at the beginning of each network buffer 602 stores pointers pointing the start and end of the user data in the network buffer 602, as indicated by broken arrows in FIG. 5.

The processing (S504) of copying the user data to the general-purpose buffers will be described with reference to FIG. 6. In this case, the user data designated by the socket API send( ) is copied to network buffers 702 allocated to the DRAM 103. A buffer management header at the beginning of each network buffer 702 stores pointers pointing the start and end of the user data in the network buffer 702, as indicated by broken arrows in FIG. 6. FIG. 6 shows header buffers 705 each for storing a TCP/IP header, and packet management structures 706, which will be described later.

Note that if the network buffers 602 become short in step S503, the network driver waits until some space in the network buffers 602 is freed, or uses the network buffers 702 allocated to the DRAM 103.

TCP/IP packetization (S505) will be described with reference to FIGS. 7A and 7B. In TCP/IP packetization, the user data in the network buffers 602 (or 702) is divided into packets each of which is added with a TCP header and IP header.

The network driver allocates, to the DRAM 103, the packet management structures 706 and the header buffers 705 each storing the TCP header and the IP header. The network driver calculates a checksum to be used in the TCP header, and stores a generated TCP header and IP header in the header buffer 705.

Each packet management structure 706 is a structure for managing the header buffer 705 and the plurality of network buffers 602 (or 702). The packet management structures 706 are managed by a chain of pointers, as indicated by a solid arrow, and data indicated by the chained packet management structures 706 are processed as one packet. The packet management structures 706 store data sizes and pointers to the data, as indicated by broken arrows. Therefore, the packet management structures 706 point a series of data.

Figure 7B:
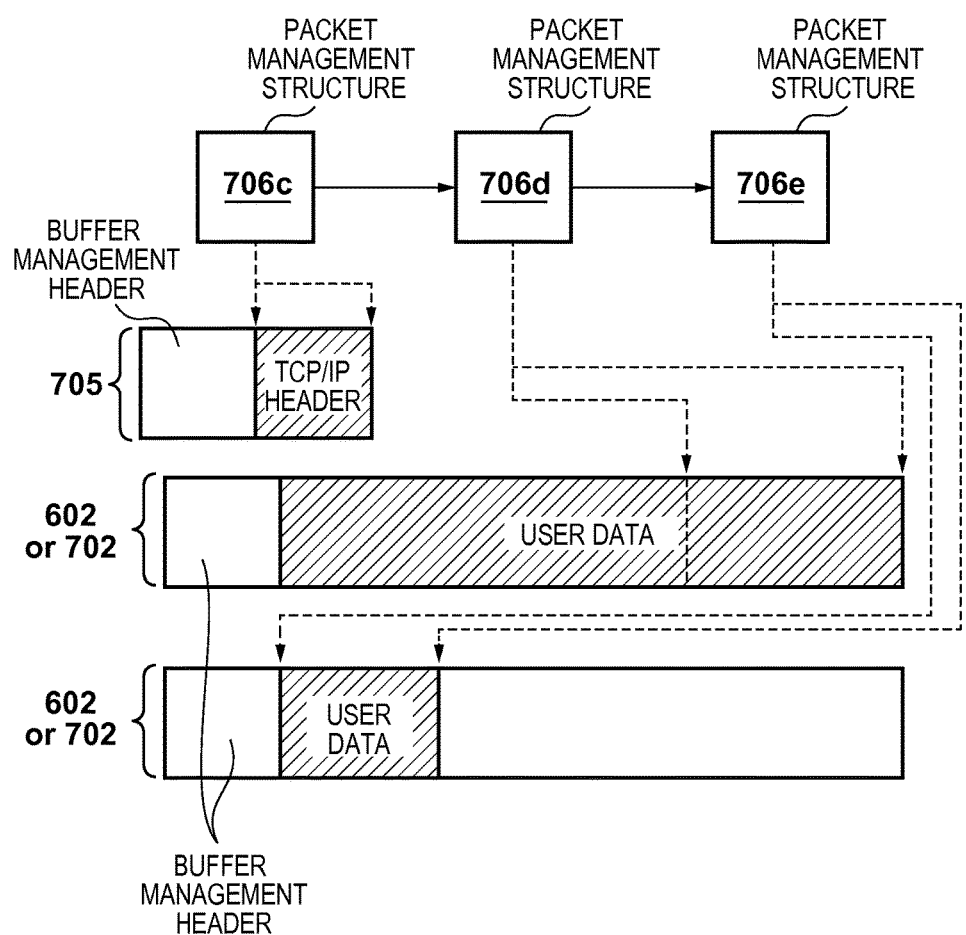

FIGS. 7A and 7B show a case in which the user data is divided into two packets. FIG. 7A shows the first packet. A packet management structure 706a points the TCP/IP header of the header buffer 705, and a packet management structure 706b points some of the user data from the start to the middle of the first network buffer. The first packet is generated from these data.

FIG. 7B shows the second packet. A packet management structure 706c points the TCP/IP header of the header buffer 705, and packet management structures 706d point the remaining user data in the first network buffer and the user data in the second network buffer, respectively. The second packet is generated from these data.

As described above, as for a connection requiring high-speed communication, the socket API setsockopt( ) is used to set the flag SO_FASTRAM in the connection management structure. Upon calling the socket API send( ), whether to use the high-speed buffers or general-purpose buffers is determined depending on whether the flag SO_FASTRAM has been set in the connection management structure corresponding to the socket descriptor sd.

Therefore, if the use of the high-speed buffers is set, the speed of the processing of copying the user data to the network buffers and the speed of calculation of a checksum to be stored in the TCP header are increased, thereby allowing high-speed communication. The general-purpose buffers are used for a connection that does not require high-speed communication, thereby making it possible to efficiently use the limited network buffers allocated to the high-speed memory.

[Network Buffer Switching Method]

A case has been explained above in which whether to use the high-speed buffers or general-purpose buffers is designated for each socket descriptor sd, and the network buffers to be used are switched depending on the determination processing in step S502. The present invention, however, is not limited to this, and the following method can be used to switch the network buffers.

In step S502, the execution priority levels of application tasks which have called the socket API send( ) are checked. If a task has a priority level equal to or higher than a predetermined priority level, it can use the high-speed buffers. This allows a task having a high priority level to perform high-speed communication.

In step S502, the attributes (destination IP address) of each packet is determined. If the address matches a predetermined IP address, it is possible to use the high-speed buffers. This allows the high-speed communication with a specific communication partner.

In step S502, the attributes (destination port or transmission source port) of each packet is determined. If the port matches a predetermined port number, it is possible to use the high-speed buffers. The predetermined port number is often allocated to a specific communication protocol. This allows high-speed communication when performing communication using the specific communication protocol.

Furthermore, in step S502, the attributes (destination port and transmission source port) of each packet is determined. If the combination of the ports matches a predetermined combination of port numbers, it is possible to use the high-speed buffers. This allows high-speed communication in a specific connection.

In step S502, a data size upon calling the socket API send( ) is determined. If the data size exceeds a predetermined threshold, it is possible to use the high-speed buffer. This allows high-speed communication when transmitting a large amount of data.

The above conditions under which the network buffers are switched are set as system settings or the device settings of the communication apparatus, and recorded in the rewritable nonvolatile memory 109 such an EEPROM (Electrically Erasable Programmable ROM), flash memory, or HDD.

Although the TCP/IP protocol has been exemplified above, the present invention is also applicable to, for example, UDP (User Datagram Protocol).

Second Embodiment

Communication processing according to the second embodiment of the present invention will be described below. Note that in the second embodiments, the same reference numerals as those in the first embodiment denote the same components and a detailed description thereof will be omitted.

Figure 8:
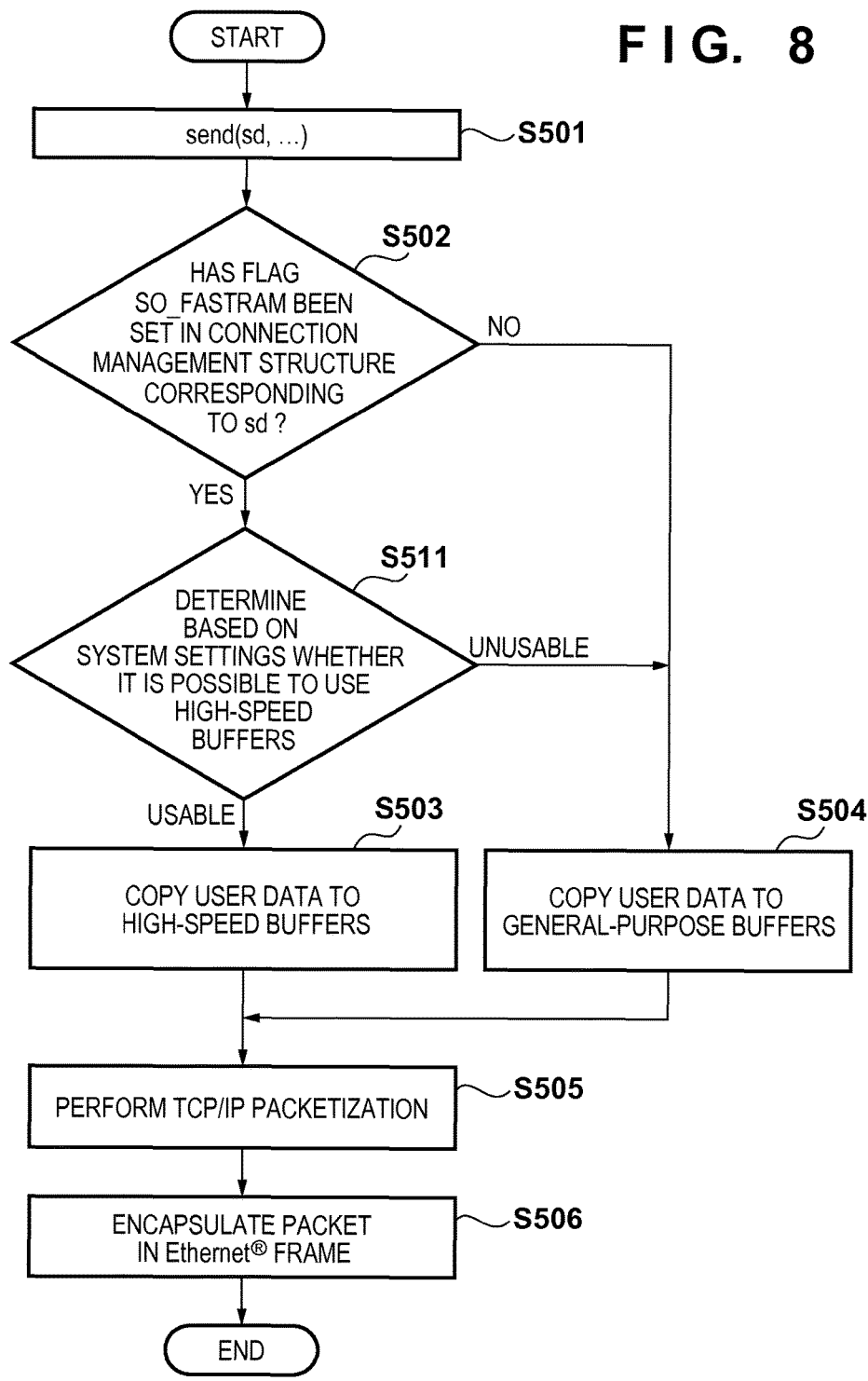
FIG. 8 is a flowchart for explaining data transmission by the socket API send( ) according to the second embodiment.

Data transmission by the socket API send( ) according to the second embodiment will be described with reference to a flowchart shown in FIG. 8. In addition to the processing shown in FIG. 4, determination processing (S511) based on system settings and the like is added when a flag SO_FASTRAM has been set in a connection management structure.

The determination processing in step S511 is to determine based on device settings and system settings whether it is possible to use high-speed buffers. That is, even if the socket API setsockopt( ) sets the use of high-speed buffers 602, when the use of the high-speed buffers is not allowed based on the system settings and the like, general-purpose buffers are used.

Assume that a plurality of socket APIs send( ) in each of which a socket descriptor sd is designated and the use of the high-speed buffers is set are called almost simultaneously. In this case, the general-purpose buffers are used in a connection for which it is not determined based on the system settings and the like that high-speed communication should be performed. On the other hand, the high-speed buffers are preferentially used in a connection for which it is determined based on the system settings and the like that high-speed communication should be performed.

A method similar to the above-described network buffer switching method is applicable to the determination processing in step S511. That is, it is possible to apply switching depending on the execution priority levels (a task having a higher priority level is prioritized) of application tasks which have called the socket APIs send( ). It is also possible to apply switching depending on the attributes (destination IP address: a specific communication partner is prioritized, destination port or transmission source port: a specific communication protocol is prioritized, and destination port and transmission source port: a specific connection is prioritized) of packets. Alternatively, it is possible to apply switching based on data sizes (a larger data size is prioritized) upon calling the socket APIs send( ).

Third Embodiment

Communication processing according to the third embodiment of the present invention will be described below. Note that in the third embodiment, the same reference numerals as those in the first and second embodiments denote the same components and a detailed description thereof will be omitted.

In the third embodiment, the communication speed of a connection is determined based on an ACK reception interval. The use of high-speed buffers by a connection for which it is determined that no high-speed communication is performed is inhibited. A determination time and a socket descriptor sd of a connection using the high-speed buffers are registered in a timer management unit 106 shown in FIG. 1. The timer management unit 106 counts the time. When the determination time elapses, the timer management unit 106 issues, to a CPU 102 (a network driver executed by the CPU 102), a signal indicating the lapse of the determination time for the corresponding connection.

Figure 9:
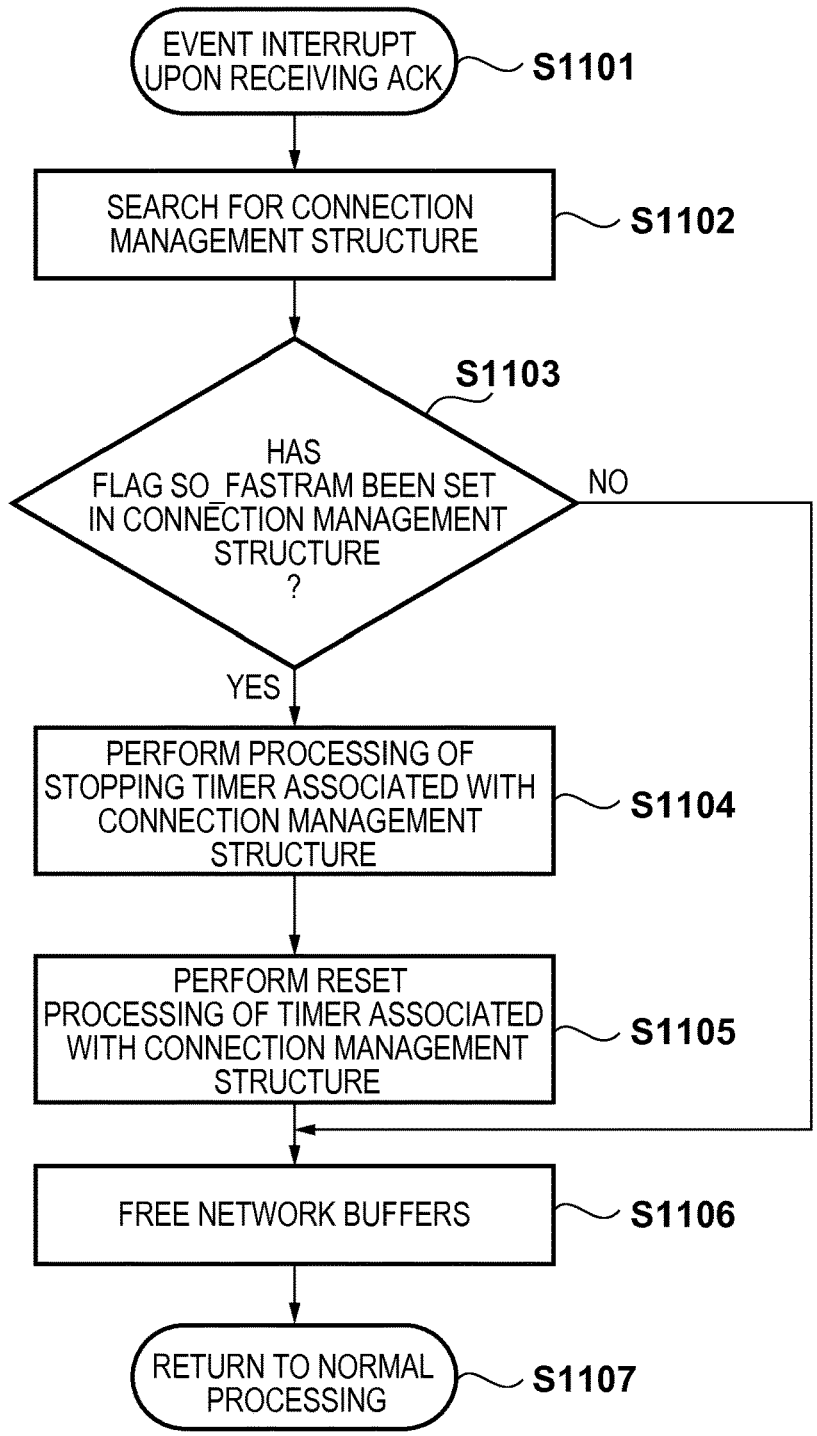
FIG. 9 is a flowchart for explaining processing upon receiving an ACK according to the third embodiment.

Processing upon receiving an ACK according to the third embodiment will be described with reference to a flowchart shown in FIG. 9. The processing shown in FIG. 9 is event interrupt processing executed upon receiving an ACK.

When an event interrupt occurs (S1101), the network driver searches for a connection management structure corresponding to the received ACK (S1102). When the network driver detects the corresponding connection management structure, it determines whether a flag SO_FASTRAM has been set (S1103).

If no flag has been set, the network driver frees network buffers allocated for retransmission (S1106), and terminates the event interrupt processing to return to normal processing (S1107).

On the other hand, if the flag has been set, that is, the connection uses the high-speed buffers, the network driver performs processing of stopping a timer associated with the detected connection management structure (S1104), and performs the reset processing of the timer (S1105). The network driver frees the network buffers allocated for retransmission (S1106), and terminates the event interrupt processing to return to the normal processing (S1107). That is, when an ACK is received, the timer is reset to count the time again.

Figure 10:
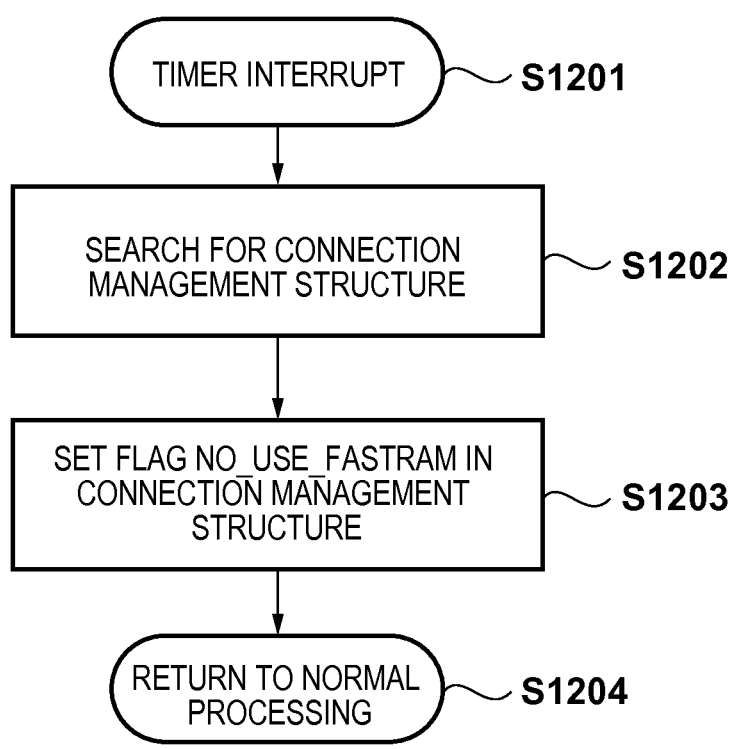
FIG. 10 is a flowchart for explaining processing when a timer management unit issues a signal indicating the lapse of a determination time according to the third embodiment.

Processing when the timer management unit 106 issues a signal indicating the lapse of the determination time according to the third embodiment will be described with reference to a flowchart shown in FIG. 10. The processing shown in FIG. 10 is timer interrupt processing.

When a timer interrupt occurs (S1201), the network driver searches for a corresponding connection management structure based on the signal issued by the timer management unit 106 (S1202). The network driver sets a non-use flag NO_USE_FASTRAM indicating inhibition of the use of the high-speed buffers in the detected connection management structure (S1203), and terminates the timer interrupt processing to return to the normal processing (S1204).

Figure 11:
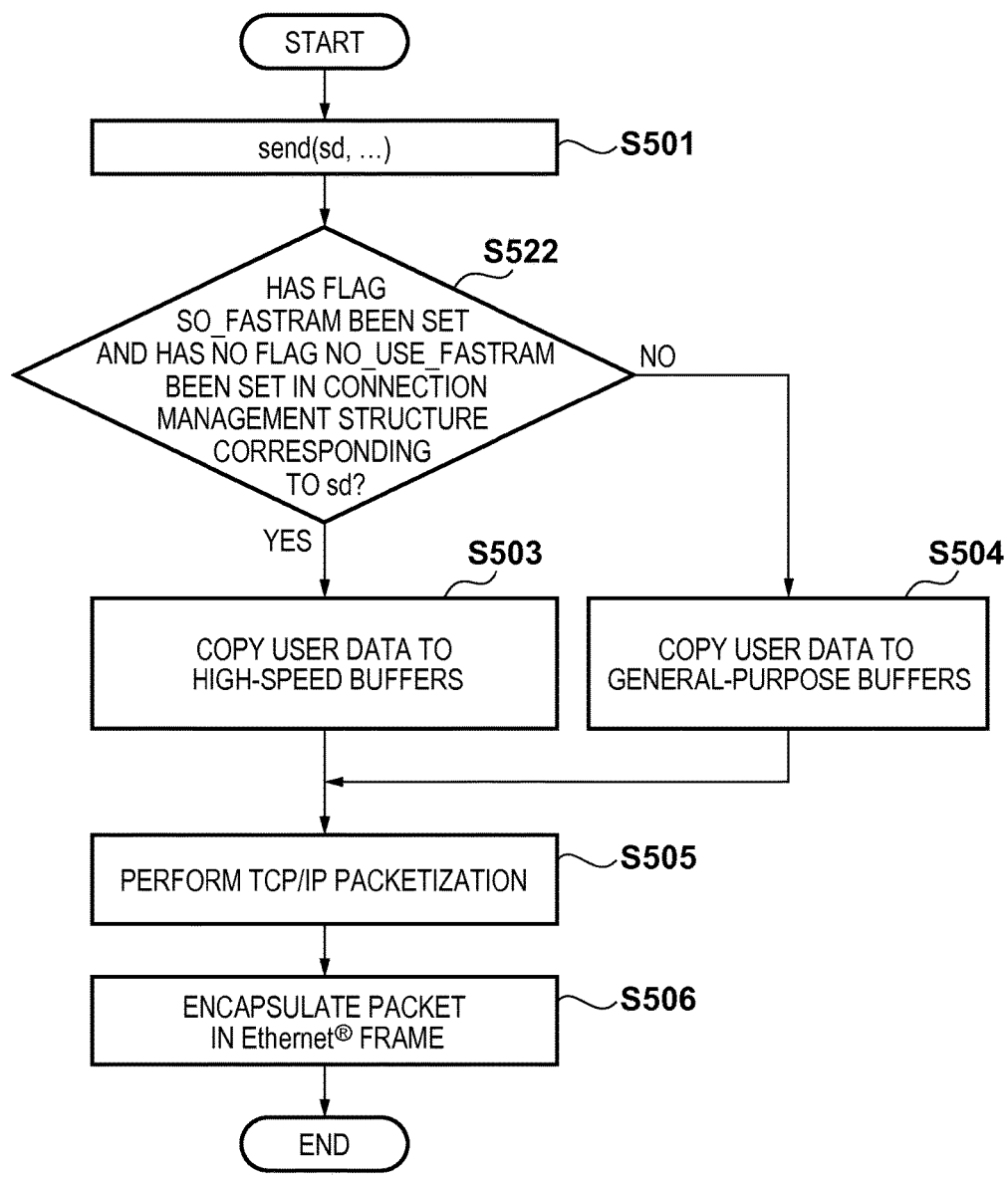
FIG. 11 is a flowchart for explaining data transmission by the socket API send( ) according to the third embodiment.

Data transmission by the socket API send( ) according to the third embodiment will be described with reference to a flowchart shown in FIG. 11. The determination processing in step S502 of FIG. 4 is changed to processing (S522) of determining the flags SO_FASTRAM and NO_USE_FASTRAM of the connection management structure corresponding to the socket descriptor sd.

That is, in the third embodiment, if the flag SO_FASTRAM has been set but no flag NO_USE_FASTRAM has been set in the connection management structure corresponding to the socket descriptor sd, user data is copied to the high-speed buffers (S503). Alternatively, if no flag SO_FASTRAM has been set but the flag NO_USE_FASTRAM has been set in the connection management structure, the user data is copied to general-purpose buffers (S504).

Data transmission by the socket API send( ) when the second and third embodiments are combined will be described with reference to a flowchart shown in FIG. 12. That is, if the flag SO_FASTRAM has been set but no flag NO_USE_FASTRAM has been set in the connection management structure corresponding to the socket descriptor sd, processing (S511) of determining based on system settings whether it is possible to use the high-speed buffers is performed.

Figure 12:
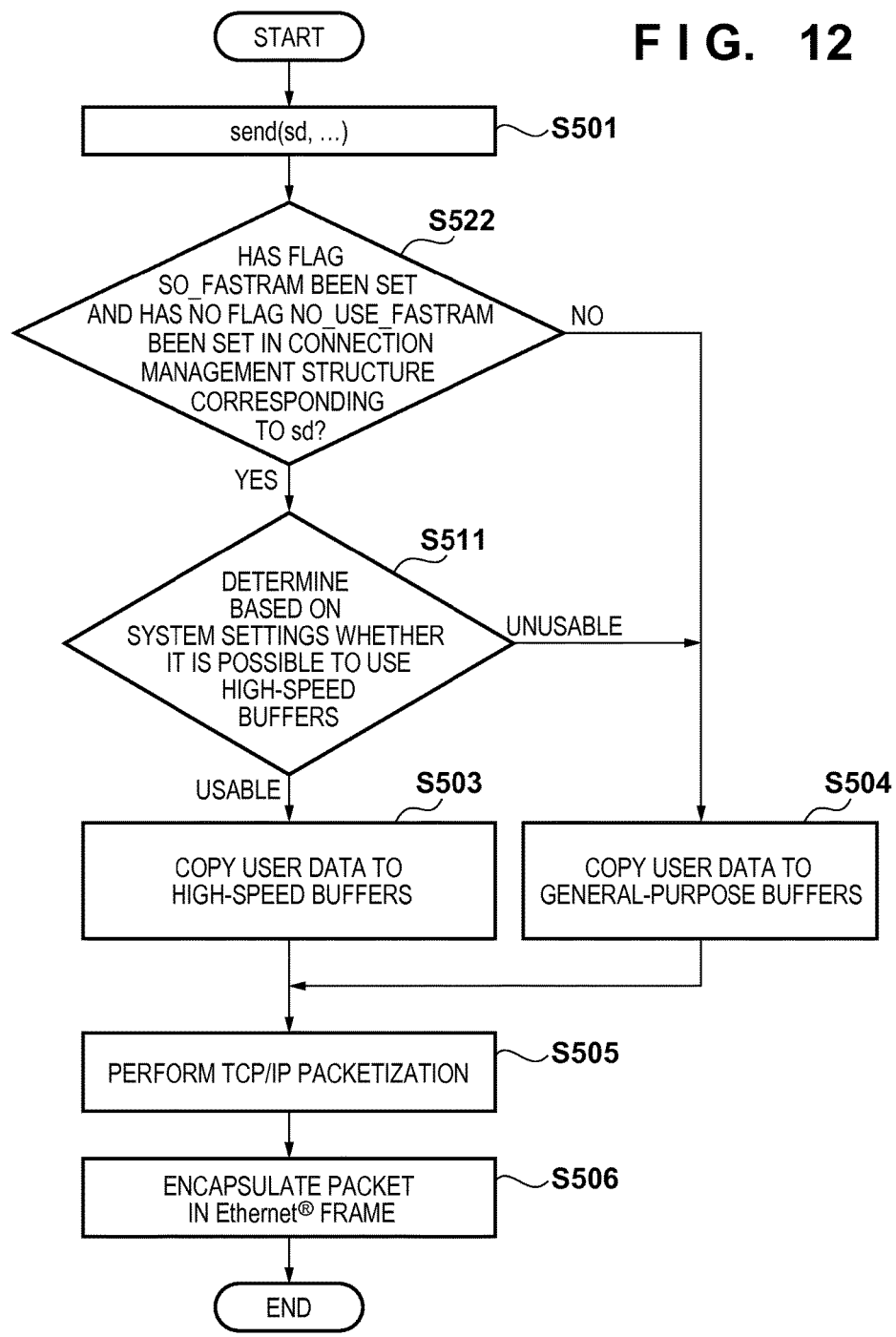
FIG. 12 is a flowchart for explaining data transmission by the socket API send( ) when the second and third embodiments are combined.

In the processing shown in FIG. 12, if the flag SO_FASTRAM has been set but no flag NO_USE_FASTRAM has been set in the connection management structure, and the use of the high-speed buffers is allowed, the user data is copied to the high-speed buffers (S503). Alternatively, if no flag SO_FASTRAM has been set in the connection management structure, the flag NO_USE_FASTRAM has been set in the connection management structure, or the use of the high-speed buffers is not allowed, the user data is copied to the general-purpose buffers (S504).

According to the third embodiment, the use of the high-speed buffers by a connection whose ACK reception interval is long and whose communication speed is lower than a predetermined one is inhibited, thereby enabling a connection for performing high-speed communication to preferentially use the high-speed buffers.

Note that a case in which the ACK reception interval of a connection is used to determine the communication speed has been explained. The communication speed, however, can be determined using an ACK number. That is, it is possible to calculate the communication speed based on ACK numbers stored in a plurality of received ACK packets and a data size (bytes) received by a communication partner. Also, it is possible to calculate the communication speed based on a data size (bytes) transmitted per unit time. A communication speed threshold may be set. If the calculated communication speed is lower than the threshold, it may be determined that no high-speed communication is performed.

Fourth Embodiment

Communication processing according to the fourth embodiment of the present invention will be described below. Note that in the fourth embodiment, the same reference numerals as those in the first to third embodiments denote the same components and a detailed description thereof will be omitted.

In data transmission by TCP, it is necessary to hold transmitted data for retransmission until an ACK is received from a communication partner. That is, if no ACK to the transmitted data cannot be received even after a predetermined time elapses, or the same ACK is received several times, it is determined that the communication partner could not receive the transmitted data, thereby retransmitting the held data. In other words, it is impossible to free network buffers storing the data until an ACK to the transmitted data is received, which may hinder the efficient use of high-speed buffers.

To solve this problem, in the fourth embodiment, when reception of an ACK is delayed, the network driver determines that retransmission will be performed, and copies data in the high-speed buffers to the general-purpose buffers to free the high-speed buffers.

Figure 13:
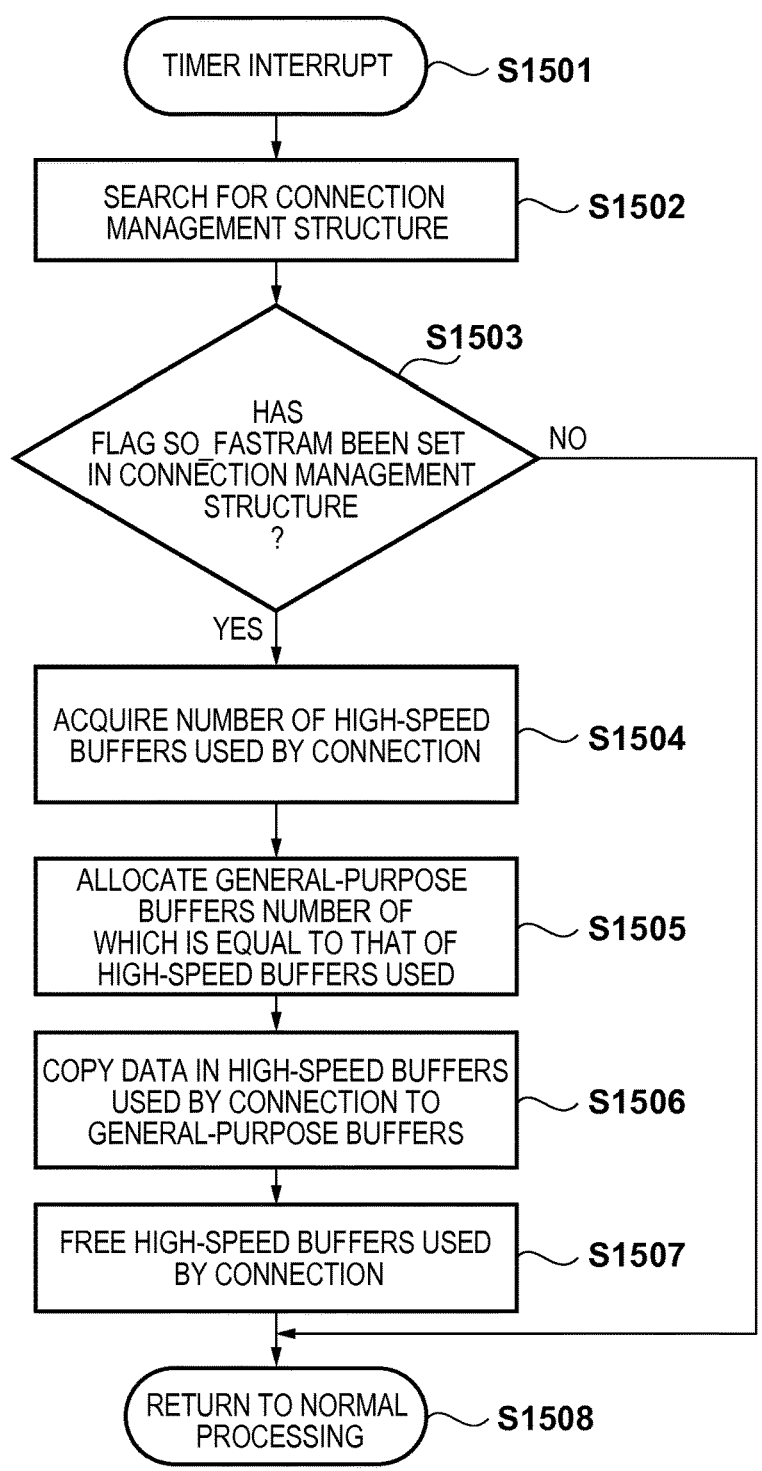
FIG. 13 is a flowchart for explaining processing when a timer management unit issues a signal indicating that a registration time is exceeded according to the fourth embodiment.

In the fourth embodiment, the event interrupt processing shown in FIG. 9 is executed upon receiving an ACK. However, processing when a timer management unit 106 issues a signal indicating that a registration time is exceeded is different. The processing when the timer management unit 106 issues a signal indicating that the registration time is exceeded according to the fourth embodiment will be described with reference to a flowchart shown in FIG. 13. The processing shown in FIG. 13 is timer interrupt processing.

When a timer interrupt occurs (S1501), the network driver searches for a corresponding connection management structure based on the signal issued by the timer management unit 106 (S1502). When the network driver detects the corresponding connection management structure, it determines whether a flag SO_FASTRAM has been set (S1503). Note that in consideration of a combination with the third embodiment, it is determined whether the flag SO_FASTRAM has been set and no flag NO_USE_FASTRAM has been set (S1503).

If no flag SO_FASTRAM has been set (or the flag NO_USE_FASTRAM has been set), the network driver determines that the connection uses no high-speed buffers, and terminates the timer interrupt processing to return to normal processing (S1508).

If the flag SO_FASTRAM has been set (and no flag NO_USE_FASTRAM has been set), the network driver determines that the connection uses the high-speed buffers. The network driver checks the number of high-speed buffers used by the connection (S1504), and allocates general-purpose buffers the number of which is equal to that of high-speed buffers (S1505). The network driver copies data in the high-speed buffers used by the connection to the general-purpose buffers (S1506), frees the high-speed buffers used by the connection (S1507), and terminates the timer interrupt processing to return to the normal processing (S1508).

Similarly to the third embodiment, the flag NO_USE_FASTRAM may be set in the connection management structure corresponding to the connection between the processing (S1507) of freeing the high-speed buffers and the processing (S1508) of returning to the normal processing. Furthermore, it is possible to combine the second, third, and fourth embodiments.

As described above, it is possible to free earlier the high-speed buffers used by a connection in which communication is delayed, thereby enabling another connection to preferentially use the high-speed buffers.

Fifth Embodiment

Communication processing according to the fifth embodiment of the present invention will be described below. Note that in the fifth embodiment, the same reference numerals as those in the first to fourth embodiments denote the same components and a detailed description thereof will be omitted.

The arguments of the socket API socket( ) are used to issue an instruction of the use of TCP in TCP/IP communication. If the first argument of the socket API is PF_INET (AF_INET) or PF_INET6(PF_INET6) and the second argument of the socket API is SOCK_STREAM, the use of TCP is indicated. For example, socket(AF_INET, SOCK_STREAM, 0) calls IPv4 (Internet Protocol version 4) communication by TCP. At this time, a flag indicating TCP communication is set in a connection management structure corresponding to a socket descriptor (sd) 302.

Figure 14:
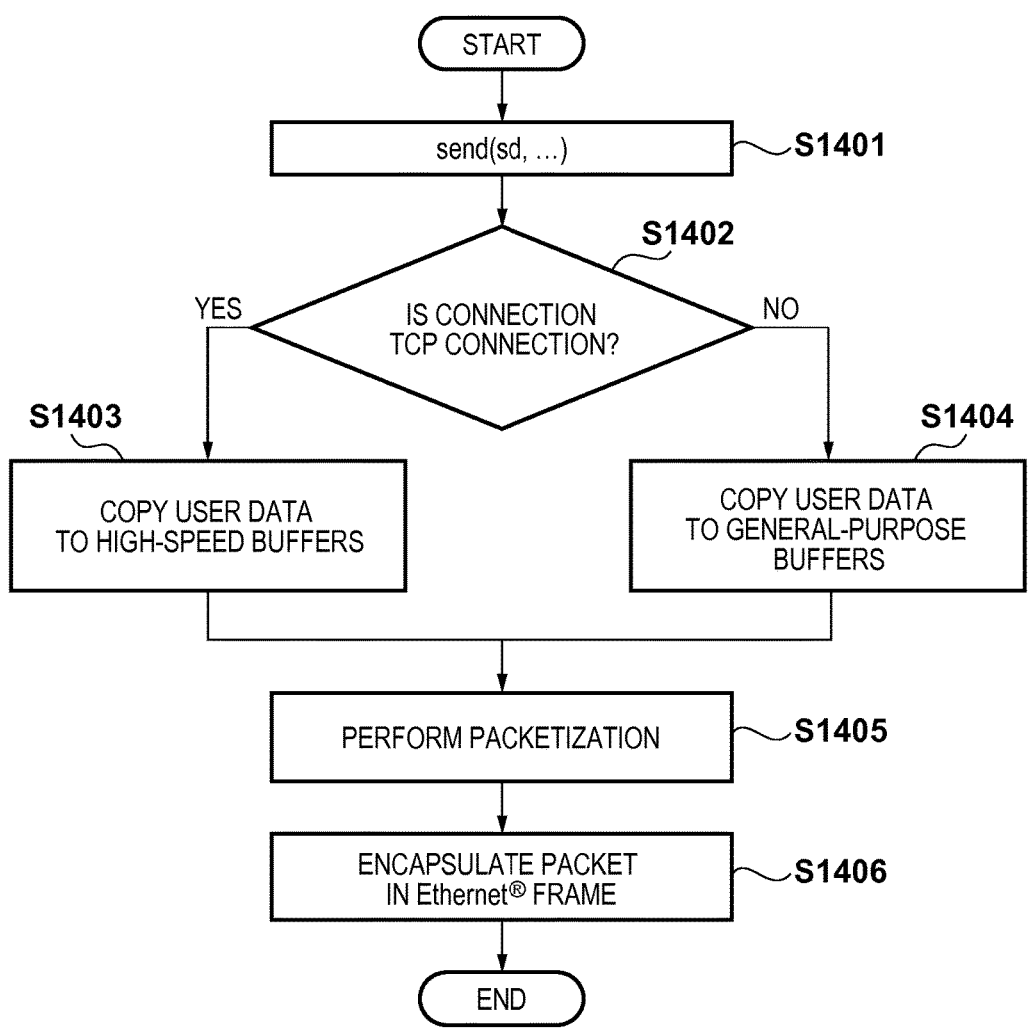
FIG. 14 is a flowchart for explaining data transmission by the socket API send( ) according to the fifth embodiment.

Data transmission by the socket API send( ) according to the fifth embodiment will be described with reference to a flowchart shown in FIG. 14. An application executed by the CPU 102 calls send( ) in which the socket descriptor sd is designated (S1401). Upon calling send( ), the network driver checks the connection management structure corresponding to the socket descriptor sd, and determines whether communication is TCP communication (S1402).

If a TCP flag has been set in the connection management structure corresponding to the socket descriptor sd, the network driver copies user data to high-speed buffers allocated to an SRAM 101 (S1403). On the other hand, if no TCP flag has been set (for example, communication is UDP communication), the network driver copies the user data to general-purpose buffers allocated to a DRAM 103 (S1404).

The network driver calculates a checksum for generating a packet header, generates a packet header, and packetizes the user data (S1405). Furthermore, the network driver generates an Ethernet® header, encapsulates the packet in an Ethernet® frame, and transmits the Ethernet® frame to the MAC 104 (S1406).

This makes it possible to preferentially allocate the high-speed buffers to a TCP communication packet in which a large amount of data is often transmitted. When there exists a communication protocol by which a large amount of data is often transmitted in addition to TCP communication, if it is determined in step S1402 that communication is performed using the communication protocol, it is possible to use the high-speed buffers.

Sixth Embodiment

Communication processing according to the sixth embodiment of the present invention will be described below. Note that in the sixth embodiment, the same reference numerals as those in the first to fifth embodiments denote the same components and a detailed description thereof will be omitted.

In the aforementioned embodiments, a case has been explained in which when allocating the network buffers for data transmission, whether to use the general-purpose buffers allocated to the DRAM 103 or the high-speed buffers allocated to the high-speed SRAM 101 is switched. In the sixth embodiment, a case will be described in which general-purpose buffers are preferentially allocated as network buffers used for reception by the network driver, and high-speed buffers are preferentially allocated as network buffers used for processing except for reception by the network driver.

Figure 15:
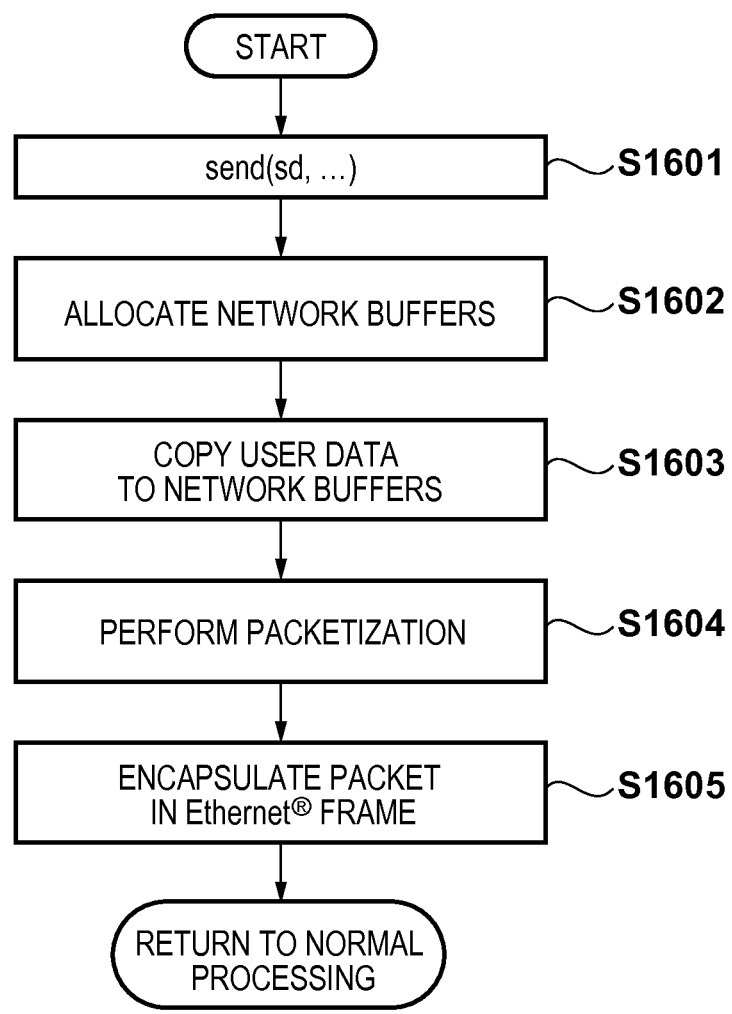
FIG. 15 is a flowchart for explaining data transmission by the socket API send( ) according to the sixth embodiment.

Data transmission by the socket API send( ) according to the sixth embodiment will be described with reference to a flowchart shown in FIG. 15. Details of network buffer allocation processing in step S1602 shown in FIG. 15 will be explained with reference to a flowchart shown in FIG. 16. FIG. 16 shows a case in which the high-speed buffers are preferentially allocated except when network buffers used for reception by the network driver are allocated.

An application executed by a CPU 102 calls send( ) in which a socket descriptor sd is designated (S1601). Upon calling send( ), the network buffer allocation processing according to the flowchart of FIG. 16 is performed (S1602). Upon calling the network buffer allocation processing by send( ), the high-speed buffers are preferentially allocated, instead of allocating the reception buffers of the network driver.

The network driver copies user data to the network buffers (S1603), calculates a checksum and the like to packetize the user data (S1604), encapsulates the packet in an Ethernet® frame, and transmits the Ethernet® frame to a MAC 104 (S1605).

The network buffer allocation processing (S1602) will be described next. Upon calling the network buffer allocation processing (S1611), the network driver determines whether the processing is to allocate the reception buffers of the network driver (S1612). If the network driver determines that the processing is to allocate the reception buffers of the network driver, the general-purpose buffers are allocated (S1614).

On the other hand, if the processing is not to allocate the reception buffers of the network driver, it is determined whether there is free space in the high-speed buffers (S1613). If there is free space, the high-speed buffers are allocated (S1615). If there is no free space in the high-speed buffers, the general-purpose buffers are allocated (S1614).

It is necessary to allocate a number of reception buffers as the reception buffers of the network driver since how many packets are received and the time when the packets are received are unknown. In other words, the use frequency of the buffers allocated for reception of the network driver is low. Therefore, the general-purpose buffers are allocated as the reception buffers of the network driver, whose use frequency is low, and the high-speed buffers are preferentially allocated for processing except for reception of the network driver. In other words, the general-purpose buffers are used as the reception buffers of the network driver, and the high-speed buffers are preferentially used as network buffers for other communications. This can improve the utilization factor of the high-speed buffers.

Other Embodiment

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-160793 filed Aug. 1, 2013 and No. 2014-098893 filed May 12, 2014 which are hereby incorporated by reference herein in their entirety.

What is claimed is:

1. A communication apparatus comprising:
a first memory;
a second memory that allows higher-speed access than the first memory; and one or more computers that cause the communication apparatus to:
determine whether a communication protocol of transmission data is Transmission Control Protocol (TCP) or User Datagram Protocol (UDP);
use the first memory as a network buffer to packetize the transmission data, in a case where it is determined that the communication protocol of the transmission data is UDP;
use the second memory as a network buffer to packetize the transmission data, in a case where it is determined that the communication protocol of the transmission data is TCP,
wherein, even when it is determined that the communication protocol of the transmission data is TCP, in a case where an available network buffer capacity in the second memory is smaller than a predetermined amount, the first memory is used as a network buffer to packetize the transmission data; and
transmit a packet which comprises the transmission data to a network.

2. The communication apparatus according to claim 1, wherein the first memory is a dynamic random-access memory (DRAM), and the second memory is a static random-access memory (SRAM).

3. The communication apparatus according to claim 1, wherein the first memory stores the transmission data after transmitting the packet to the network so that the communication apparatus is able to retransmit the packet to the network.

4. The communication apparatus according to claim 1, wherein the one or more computers further causes the communication apparatus to move, in a case where the second memory is used to packetize the transmission data, the transmission data from the second memory to the first memory after transmitting the packet to the network so that the communication apparatus is able to retransmit the packet to the network.

5. A data processing method of a communication apparatus having a processor, a first memory, and a second memory that allows higher-speed access than the first memory, the method comprising:
determining whether a communication protocol of transmission data is Transmission Control Protocol (TCP) or User Datagram Protocol (UDP);
using the first memory as a network buffer to packetize the transmission data, in a case where it is determined that the communication protocol of the transmission data is UDP;
using the second memory as a network buffer to packetize the transmission data, in a case where it is determined that the communication protocol of the transmission data is TCP,
wherein, even when it is determined that the communication protocol of the transmission data is TCP, in a case where an available network buffer capacity in the second memory is smaller than a predetermined amount, the first memory is used as a network buffer to packetize the transmission data; and
transmitting a packet which comprises the transmission data to a network.

6. A non-transitory computer readable medium storing a computer-executable program for causing a computer to perform a data processing method of a communication apparatus having a processor, a first memory, and a second memory that allows higher-speed access than the first memory, the method comprising:

determining whether a communication protocol of transmission data is Transmission Control Protocol (TCP) or User Datagram Protocol (UDP);

using the first memory as a network buffer to packetize the transmission data, in a case where it is determined that the communication protocol of the transmission data is UDP;

using the second memory as a network buffer to packetize the transmission data, in a case where it is determined that the communication protocol of the transmission data is TCP, wherein, even when it is determined that the communication protocol of the transmission data is TCP, in a case where an available network buffer capacity in the second memory is smaller than a predetermined amount, the first memory is used as a network buffer to packetize the transmission data; and transmitting a packet which comprises the transmission data to a network.

* * * * *